Nov. 1, 1949.  W. M. STRATFORD  2,486,505
PROCESS FOR SYNTHESIS OF HYDROCARBONS AND THE LIKE
Filed June 20, 1945
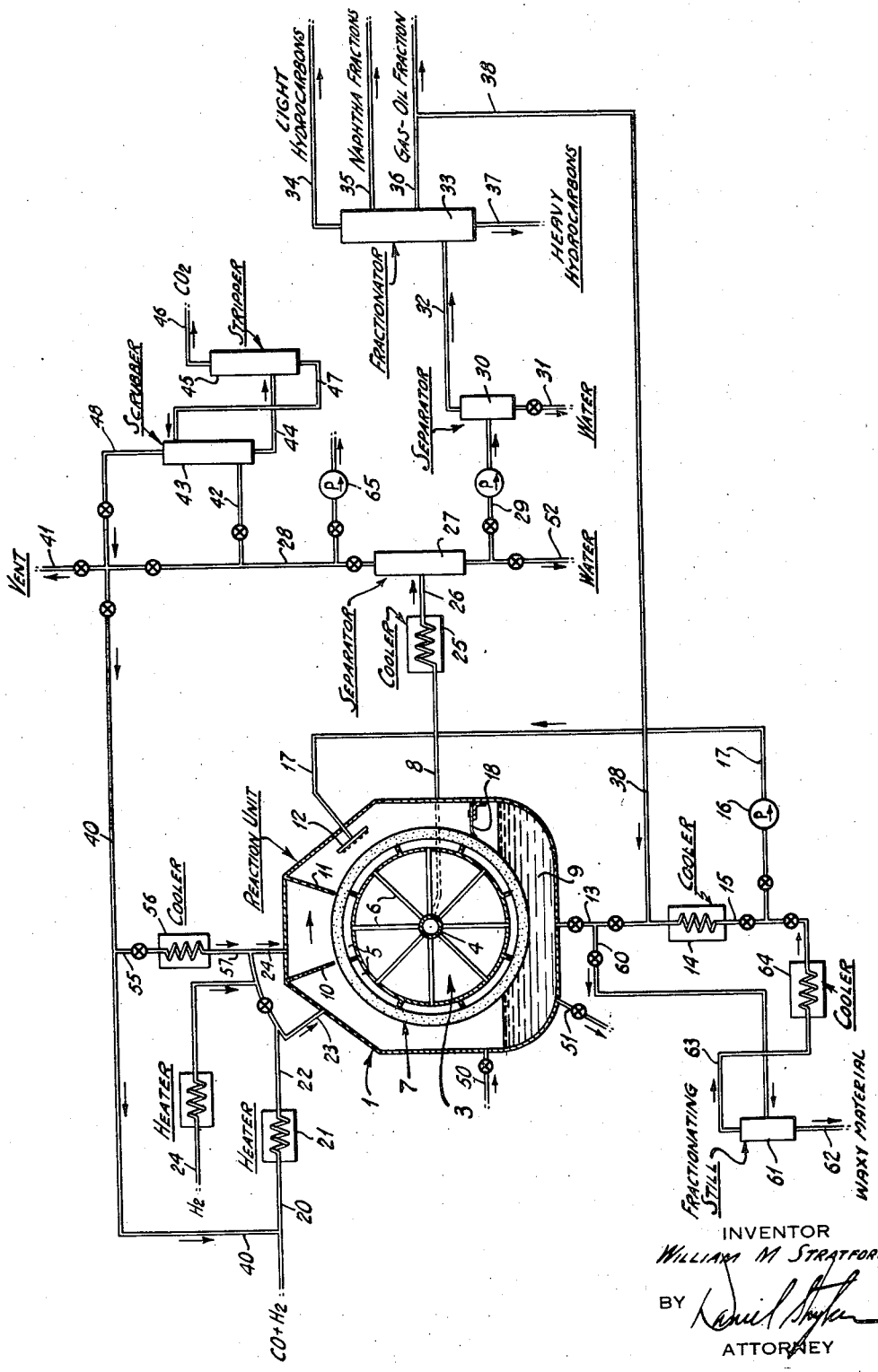
INVENTOR
William M. Stratford.
BY
ATTORNEY Patented Nov. 1, 1949

2,486,505

UNITED STATES PATENT OFFICE 2,486,505

PROCESS FOR SYNTHESIS OF HYDROCARBONS AND THE LIKE

William M. Stratford, New York, N. Y., assignor to Texaco Development Corporation, New York, N. Y., a corporation of Delaware Application June 20, 1945, Serial No. 600,471

2 Claims. (Cl. 260—449.6)

This invention relates to a process for carrying out catalytic reactions wherein the temperature of the catalyst tends to deviate substantially from a predetermined conversion temperature range such as in the formation of hydrocarbons, oxygenated hydrocarbons and the like by the catalytic exothermic reaction of carbon monoxide and hydrogen.

In accordance with my invention, the catalyst is disposed in a relatively thin, continuous and effective layer on a moving surface which travels through a reaction zone wherein the reactant gases are caused to diffuse through the catalyst at conversion temperatures. The reactant gases undergo conversion during diffusion through the catalyst, forming products of reaction. Products of reaction so formed, together with unconverted reactant gases, pass through the catalyst layer and are removed from the reaction zone for further treatment, as will be described.

As a result of heat liberated by the reaction, the temperature of the catalyst rises above the aforesaid predetermined conversion temperature range. The heated catalyst layer moves from the reaction zone into a temperature adjustment zone wherein it is subjected to contact with a fluid heat exchange medium under conditions such that excess heat of reaction is removed and the temperature of the catalyst reduced to within, or to approximately, the predetermined conversion temperature range, following which the catalyst layer is returned to the reaction zone and re-exposed to contact with reactant gases. Movement of the catalyst layer through the reaction and temperature adjustment zones is advantageously continuous and cyclical.

The invention is particularly suitable for the catalytic reaction of CO and $H^2$ to yield hydrocarbons, oxygenated hydrocarbons and the like, although it is contemplated that it may be employed for effecting other reactions of either exothermic or endothermic nature wherein it is necessary to maintain the catalyst temperature within a relatively narrow and predetermined range.

In the customary fixed bed process for the catalytic conversion of carbon monoxide and hydrogen, there are a number of operating and design problems which derive from the strongly exothermic nature of the reaction. Different products may be obtained from the catalytic reaction of carbon monoxide and hydrogen depending upon the operating conditions employed. Temperature, pressure and catalyst are all decisive in determining the nature of the resulting products. Thus at temperatures in the region of 570° F. and at atmospheric pressure with a nickel catalyst, the main product of the reaction is methane. At temperatures of 530° to 710° F. and at 300 atmospheres, methanol is the main product. To obtain a large percentage of liquid hydrocarbons in the gasoline range, using a cobalt catalyst at atmospheric pressure, the temperature must be kept in the range of 375° to 400° F. With a reaction as strongly exothermic as the reduction of carbon monoxide with hydrogen, close control of the temperature is essential.

In the conventional fixed bed process, one method of temperature control is to provide the reaction chamber with a plurality of cooling tubes. In large scale units the use of this type of temperature control contributes enormously to the equipment cost. Moreover, in the fixed bed type of operation channeling is very prone to occur, thereby decreasing the amount of conversion of the charge gas into the desired products.

In accordance with my invention, the catalyst may be disposed in a thin continuous layer over a permeable cylindrical surface arranged for rotation about its axis. A stream of reactant gas such as a mixture of carbon monoxide and hydrogen, preheated to a predetermined temperature, diffuses through the continuous catalyst layer as it rotates through a zone of conversion. The reactant gases undergo conversion as they diffuse through the catalyst layer and the desired products of reaction are formed while the temperature of the catalyst layer rises substantially as a result of the exothermic heat of reaction. Upon further rotation the catalyst layer moves out of the reaction zone and passes through a temperature adjustment zone wherein it is brought into contact with a cooling fluid.

The catalyst may also be disposed on a flat surface arranged to move through reaction and cooling zones in succession.

When an exothermic catalytic reaction is carried out in accordance with the method of this invention, the problem of heat removal is simplified. Furthermore, since the reactant gases are caused to diffuse through the relatively thin and continuous layer of catalyst by the use of a small pressure differential between the two sides of the catalyst, channeling of the reactant gases is avoided. This differential pressure is of a magnitude sufficient to cause diffusion of the synthesis gas through the catalyst layer and yet insufficient to cause fracture or channeling of the catalyst.

Cooling of the catalyst layer may be accomplished by directing a cooling spray of liquid, e. g., gas oil, onto the catalyst. The cooling spray of gas oil may effect substantial solution from the catalyst surface waxy products of the reaction, whose accumulation on the catalyst materially reduces its activity.

A gaseous medium may be employed to effect partial cooling such as gaseous products of reaction, or even cool reactant gas.

Another method of restoration of the catalyst surface to the predetermined temperature range is to immerse the movable catalyst layer in a body of gas oil or other liquid during its movement through the temperature adjustment zone. Adsorbed wax may also be removed by this method of temperature control.

If necessary, a combination of these methods of temperature control may be used to remove the excess heat of reaction and keep the temperature within the predetermined range.

The features of my invention may be embodied in a system in which the catalyst is disposed in a relatively thin continuous layer on the porous surface of an apparatus similar to an Oliver, or rotating drum type, filter. A mixture of carbon monoxide and hydrogen in the appropriate proportions, which will henceforth also be called the synthesis gas, diffuses through the catalyst layer which is disposed on the rotating drum surface of the apparatus in a manner somewhat analogous to that of a conventional filter cake. The product and unreacted gases pass through the catalyst layer and enter the interior of the rotating drum by means of a pressure differential applied between the two sides of the porous rotating drum surface. From the interior of the drum, the mixture of products and unreacted gases is removed through conventional drainage and valve mechanisms.

For purposes of illustration, my invention is described in conjunction with an operation for the manufacture of valuable hydrocarbon constituents suitable for use as motor fuels.

The synthesis gas comprises carbon monoxide and hydrogen obtained from any suitable source and in a molecular proportion which is determined by the type of catalyst used. If an iron catalyst be used, the carbon monoxide and hydrogen will be in a molecular ratio of about 1:1, whereas if a cobalt or nickel catalyst is used, the molecular ratio will be about 1 part of carbon monoxide to 2 parts of hydrogen.

For purposes of illustration, my invention will be described using a cobalt catalyst promoted with magnesia or thoria and supported on a diatomaceous earth carrier like Filter Cel. The synthesis gas consists of about 1 molecular part of carbon monoxide to 2 molecular parts of hydrogen.

This method may be more readily understood by reference to the attached drawing. In the drawing only one reaction unit wherein the catalyst is disposed on a porous cylindrical rotating drum in a continuous layer is illustrated. It is contemplated, however, that two or more of these reaction units may be employed in parallel or in series.

A sectional view of the reaction unit normal to the axis of the rotating drum is shown in the drawing. The numeral 1 designates a chamber or closed vessel within which is rotatably supported a horizontal drum or cylinder 3.

The drum 3 advantageously is substantially similar in construction to the drum of a continuous rotary drum filter and is supported on a trunnion which terminates in the customary or conventional filter valve designated by the numeral 4.

The cylindrical portion of the drum is divided into a plurality of separate segmental sections 5, each of which is connected by a pipe 6 with the valve 4. There may be any number of segmental sections and likewise each section may have a plurality of pipes connecting it with the valve 4.

The outer cylindrical surface of the drum 3 is of a porous nature and may be formed from fine mesh wire screen.

The numeral 7 designates a layer of catalyst disposed over the outer cylindrical and porous surface of the drum. The thickness of this cake may range from about 1/8 to 2 inches. The manner of disposing the catalyst layer on the drum surface will be described later.

The valve mechanism 4 communicates with a discharge pipe 8.

The lower portion of the vessel 1 advantageously provides a bowl 9 in which may be maintained a body of cooling liquid, or a body of catalyst slurry, to which reference will be made later.

The upper portion of the vessel 1 may, if desired, be provided with partitions 10 and 11 to provide separate compartments as indicated.

In operation, a stream of synthesis gas obtained from a source not shown is conducted through a pipe 20 into a heater 21 wherein it is heated to a predetermined conversion temperature, for example of about 365° to 400° F. From there the synthesis gas passes through a pipe 22, advantageously terminating in branch pipes 23 and 24 leading to the separate compartments in the upper portion of the vessel 1.

The hot synthesis gas may be split between the pipes 23 and 24, or may be passed entirely through one of them. If the partitions 10 and 11 are not used, there is no need for employing the split-stream injection.

The synthesis gas introduced through the pipe 23 diffuses through the catalyst layer 7 into the interior of the drum 3, the flow of gas through the catalyst layer being effected as a result of maintaining a pressure differential through the catalyst layer.

Substantial reaction between CO and $H_2$ constitutents of the synthesis gas occurs during diffusion through the catalyst layer with the formation of liquid hydrocarbons in the gasoline range as well as some hydrocarbons, both lower boiling and higher boiling than gasoline.

The mixture of reaction products and unreacted synthesis gas diffuses through the catalyst layer into the section 5 and from there through the pipe 6 into the valve 4 from which it passes to the discharge pipe 8.

The drum 3, as indicated, rotates in a clockwise direction so that the catalyst layer moves under the partition 10, if partitions are employed, and into the next compartment to which an additional stream of synthesis gas at the same or at a lower temperature may be introduced, if desired.

During passage of the synthesis gas through the catalyst layer, the temperature of the catalyst rises substantially as a result of heat liberated by the reaction so that cooling is necessary. Upon continued rotation of the drum, the hot catalyst layer moves under the partition 11 into the cooling zone provided with a spray 12 through which a cooling fluid is introduced, as will be described later.

The cooling fluid which may comprise a gas oil fraction of the product is applied in the form of a spray against the surface of the hot catalyst layer. As a result of the aforesaid differential in pressure prevailing between the interior of the vessel 1 and the interior of the catalyst supporting drum, the cooling liquid is caused to diffuse at least in part through the catalyst layer. That portion of the cooling liquid thus passing through the catalyst flows into the valve mechanism 4 and discharges therefrom through the discharge pipe 8. A portion of the cooling liquid sprayed onto the catalyst surface may flow over the exterior thereof and collect in the bowl 9 of the vessel 1.

This liquid collecting in the bowl 9 is advantageously drawn off in a continuous manner through a pipe 13 and passed through a cooler 14, and from there through a pipe 15 through which it is returned, all or in part, by means of a pump 16 and a pipe 17 to the spray 12.

As a result of this application of cooling liquid to the filter surface, its temperature is reduced. Part of the cooling may occur during rotation of the catalyst surface through the body of liquid maintained in the bowl 9. At any rate, conditions are maintained such that the catalyst temperature is restored to a temperature within the range about 350° to 400° F. prior to rotation back into the compartment of the vessel 1 into which the feed stream of synthesis gas is entering through the pipe 23.

The reaction products, unreacted gas and cooling liquid which have passed through the catalyst into the interior of the filter drum are continuously conducted from the discharge pipe 8 to a cooler 25 wherein water, naphtha and higher boiling hydrocarbon constituents are condensed. The resulting cooled mixture flows through pipe 26 to a separator 27 wherein separation is effected between condensate and gaseous constituents.

The gaseous constituents comprising carbon monoxide, hydrogen, carbon dioxide and normally gaseous hydrocarbons are removed through a pipe 28.

The condensate comprising normally liquid hydrocarbons and water is drawn off through a pipe 29 to a separator 30 wherein separation of water is effected. Water is discharged through a pipe 31. The liquid hydrocarbons are removed through a pipe 32 to a fractionating unit 33.

The hydrocarbons may be fractionated into a plurality of fractions as desired; for example, a light fraction comprising $C_4$ and $C_5$ hydrocarbons or a mixture of $C_4$, $C_5$ and $C_6$ hydrocarbons is removed through a pipe 34 while a naphtha fraction is removed through a pipe 35. A gas oil fraction may be removed through a pipe 36 while higher boiling material is removed through a pipe 37.

A portion of the gas oil fraction discharged through the pipe 36 may be recycled through a pipe 38 to the cooler 14 for use as cooling liquid in the manner previously described.

The gaseous constituents, namely, carbon monoxide, hydrogen and the normally gaseous hydrocarbons which have been removed from the separator 27 through the pipe 28 may be reintroduced directly as recycle gas into the reaction unit through a pipe 40 which leads to the feed line 20, or it may be vented in whole or in part through a vent 41.

Alternatively, the carbon dioxide may be stripped from this recycle gas and utilized in the production of charge gas by reaction with methane. If carbon dioxide is to be used in this fashion, the gaseous constituents which have been removed from the separator 27 through the pipe 28 are led through a pipe 42 into a scrubber 43 wherein the carbon dioxide is absorbed in a suitable fluid medium, e. g., triethanolamine solution. This scrubber 43 is connected through a pipe 44 with a stripper 45 in which the carbon dioxide absorbent may be regenerated after it has been saturated with carbon dioxide. The carbon dioxide resulting from this regeneration is led through a pipe 46 to a unit not shown wherein the synthesis gas is prepared. From the stripper 45, the regenerated absorbent solution is returned to the scrubber 43 through a pipe 47. The carbon monoxide, hydrogen and normally gaseous hydrocarbons leave the scrubber 43 by a pipe 48 through which they may be returned through the pipe 40 to the feed line 20 from where they may be introduced into the reaction unit as recycle gas through the heater 21 and the inlet pipe 22. This carbon dioxide-stripped gas may also be vented in whole or in part through the vent 41.

If the recycle gas from which carbon dioxide may or may not have been stripped is to be used to effect partial cooling, it may be diverted from the pipe 40 into the cooler 56 through a branch pipe 55. From there, the cooled recycle gas may pass to the inlet pipe 24 through a pipe 57. Upon introduction into the compartment, partial cooling of the catalyst layer is accomplished by the sensible heat absorbed by the recycle gas.

The gas oil sprayed through the spray 12 and also maintained in the bowl 9 serves to dissolve and remove waxy products which tend to accumulate on the catalyst. Therefore, provision may be made for removing the dissolved waxy products from the liquid which is drawn off through the pipe 13. In such case all or a portion of the withdrawn liquid is removed through a branch pipe 60 to a fractionating still 61 wherein the gas oil is fractionated from the higher boiling waxy material. This waxy material is discharged through a pipe 62 and the gas oil is passed through a pipe 63 and a cooler 64 from which it may be recycled all or in part through the pump 16, pipe 17 and spray 12.

Mention has previously been made of maintaining a pressure differential through the catalyst layer. This may be accomplished by maintaining a reduced pressure in the discharge pipe 8 and separator 27 by means of a vacuum pump 65. On the other hand, it may also be obtained by introducing the synthesis gas mixture into the reaction zone at a pressure above atmospheric through the inlet system described above.

Because of the pressure differential maintained through the catalyst layer, the gas oil from the bath tends to permeate and pass through the catalyst layer into the interior of the filter drum 3. Some permeation of this cooling gas oil is desirable in order to effect cooling of the entire catalyst layer. However, this passage of the gas oil through the catalyst layer may be kept at a minimum in order to prevent a large quantity of cooling liquid from entering into the separating and fractionating system. By insertion of suitable blocks in the valve 4 in accordance with conventional filter practice, it is possible to vary the absolute pressure prevailing within each drum section 5 as it moves from one point to the next in its path of travel. In this way, the pressure drop through the catalyst layer can be maintained sufficiently large during passage of each section 5 through the conversion zone so as to effect diffusion of the reactants through the catalyst layer. The pressure drop can be maintained relatively small, or approximately zero, if desired, during passage of each section through the body of cooling liquid in the bowl 9.

The gas oil which permeates through the catalyst layer flows through the pipe 6 into the valve 4 and from there into the separating and fractionating system wherein it is separated from the other normally liquid hydrocarbons in the fractionating unit 33. From there it may be returned via pipes 36 and 38 to the cooler 14 and then to the spray 12 via the pipe 17.

Two means of depositing the catalyst on the rotating porous filter drum may be employed. A typical cobalt catalyst comprising, as mentioned above, metallic cobalt, promoters and a diatomaceous earth carrier, may be introduced, in the unreduced state as the carbonates of the metals, in an aqueous slurry into the lower portion of the shell 1 through an opening 50. By means of vacuum pump 65 the unreduced catalyst is deposited on the rotating filter drum 3 in accordance with conventional filter procedure. By means of a scraper 18, the thickness of a wet unreduced catalyst layer is regulated so that a layer of uniform depth is obtained on the surface of the entire drum 3. The wet unreduced catalyst layer will undergo shrinkage in volume during drying and reduction and allowance can be made for this shrinkage during the deposition of the wet unreduced catalyst layer. The thickness of the reduced catalyst layer is advantageously between ⅛ and 2 inches.

After a wet unreduced catalyst layer of desired thickness is deposited on the surface of the rotating porous filter drum 3, the surplus aqueous slurry is removed from the unit by means of an exit 51 and the catalyst layer is dried slowly at about 250° F. The water which is drawn into the interior of the filter drum 3 during the deposition of the catalyst flows through the pipe 6 into the valve 4 whence it proceeds along the pipe 8 to the cooler 25; from where it flows through the pipe 26 into the separator 27, from which it may be drawn off through the exit pipe 52. Hydrogen is introduced through the inlet 24 into the unit and the unreduced catalyst which is distributed on the surface of the filter drum 3 in a layer of uniform thickness is reduced at a temperature of about 650° F. to 750° F.—preferentially at 660° F. The carbon dioxide and water resulting from this treatment proceed into the separator 27 through the valve 4, pipes 8 and 26 and the cooler 25. When the reduction of the catalyst is complete, which can be determined by the amount of water withdrawn from the separator 27 through the exit pipe 52, the flow of hydrogen through the opening 24 is stopped and conditioning of the catalyst, which will be described in more detail later, may be commenced.

The other method of disposing the catalyst layer on the filter drum 3 consists of introducing a gas oil slurry of reduced catalyst into the lower portion of the shell 1 through the opening 50, displacing the air in the upper portion of the unit with synthesis gas mixture and then depositing the reduced catalyst on the rotating filter drum 3 by means of vacuum derived from the vacuum pump 65. The reduced catalyst is deposited from its gas oil slurry on the rotating porous drum 3. The thickness of the catalyst layer is adjusted by means of the scraper 18. The depth of this catalyst layer is advantageously within the range of ⅛ to 2 inches. The gas oil from which the catalyst is deposited on the filter drum 3 may be left within the unit to serve as a cooling medium for the reaction between carbon monoxide and hydrogen. After the reduced catalyst has been deposited in a layer of desired thickness, it may be conditioned.

This conditioning treatment consists of passing the synthesis gas mixture through the catalyst for 2 to 6 hours, starting at a temperature of about 200° to 300° F. and concluding when the predetermined temperature range at which the reaction is to be carried out, 365° to 400° F. in this case, is reached. This synthesis gas for conditioning is introduced into the reaction unit through the same apparatus which has previously been described for the reaction proper.

It will be understood that this example is illustrative of the application of the invention and no limitations are intended thereby. Many modifications immediately suggest themselves and are included within the scope of the invention. This invention may be adapted to exothermic reactions other than the catalytic conversion of carbon monoxide and hydrogen into valuable products. Other means may be employed for disposing a catalyst on a moving surface, e. g., a continuous belt mechanism. Another adaptation of my invention would be to dispose the catalyst in a thin and continuous layer on a rotating leaf filter type of apparatus in which the filter surface is in the form of a plurality of filter leaves distributed along an axis.

An iron or nickel catalyst may be employed equally as well as a cobalt catalyst in the reaction of carbon monoxide and hydrogen. A supported or unsupported catalyst may be used. The conditions of temperature and pressure under which the reaction occurs may be varied so that other valuable products such as oxygenated hydrocarbons are obtained.

Obviously many modifications and variations of the invention, as hereinbefore set forth, may be made without departing from the spirit and scope thereof and therefore only such limitations should be imposed as are indicated in the appended claims.

I claim:

1. In a process for effecting synthesis of hydrocarbons and oxygenated hydrocarbons from carbon monoxide and hydrogen in the presence of a solid synthesis catalyst wherein the catalyst is passed in continuously recurring sequence through a reaction zone wherein the temperature of the catalyst is substantially increased as a result of the heat liberated by the reaction and through a cooling zone wherein the temperature of the catalyst is restored, the method which comprises disposing the catalyst in a relatively thin permeable continuous layer about the exterior surface of a relatively thin permeable cylindrical support, rotating said cylindrical layer of catalyst and support about a substantially horizontal axis so that the catalyst moves through said zones during rotation, continuously passing said reactant gases under conversion conditions through said layer of catalyst in a radial direction toward the axis of rotation as said catalyst passes through said reaction zone, and continuously passing a cooled gaseous fraction of the effluent of said reaction through the resulting heated catalyst in a radial direction toward the axis of rotation and thereafter passing a hydrocarbon cooling liquid through said catalyst in a radial direction toward the axis of rotation as the catalyst moves through said cooling zone.

2. A process as defined in claim 1 wherein said catalyst layer has a thickness within the range of from about ⅛ inch to about 2 inches.

WILLIAM M. STRATFORD.

REFERENCES CITED

The following references are of record in the file of this patent:

UNITED STATES PATENTS

| Number | Name | Date |
| --- | --- | --- |
| 1,004,035 | Kayser | Sept. 26, 1911 |
| 1,008,474 | Kayser | Nov. 14, 1911 |
| 1,113,151 | Chisholm | Oct. 6, 1914 |
| 1,828,734 | Dormon | Oct. 27, 1934 |
| 1,836,325 | James | Dec. 15, 1931 |
| 2,246,345 | Campbell | June 17, 1941 |
| 2,268,535 | Schutte | Dec. 20, 1941 |
| 2,309,034 | Barr | Jan. 19, 1943 |
| 2,347,682 | Gunness | May 2, 1944 |
| 2,389,378 | Marisic | Nov. 20, 1945 |

FOREIGN PATENTS

| Number | Country | Date |
| --- | --- | --- |
| 257,825 | Germany | Mar. 22, 1913 |